United States Patent [19]

Chen et al.

[11] Patent Number: 5,565,753
[45] Date of Patent: Oct. 15, 1996

[54] METHOD AND APPARATUS FOR CURRENT REBALANCE IN INDUCTION MOTOR

[75] Inventors: Li Chen, Milwaukee, Wis.; Peter Unsworth, Lewes, England

[73] Assignee: Allen-Bradley Company, Inc., Milwaukee, Wis.

[21] Appl. No.: 226,540

[22] Filed: Apr. 12, 1994

[51] Int. Cl.⁶ .................................................... H02P 5/28
[52] U.S. Cl. ............................................................. 318/809
[58] Field of Search ...................................... 318/798–84

[56] References Cited

U.S. PATENT DOCUMENTS

| | | | |
|---|---|---|---|
| 3,652,924 | 3/1972 | Dieterich et al. | 318/807 X |
| 4,482,852 | 11/1984 | Muskovac | 318/729 |
| 4,862,052 | 8/1989 | Unsworth et al. | 318/757 |
| 5,008,608 | 4/1991 | Unsworth et al. | 318/729 |
| 5,151,642 | 9/1992 | Lombardi et al. | 318/779 |
| 5,153,489 | 10/1992 | Unsworth et al. | 318/729 X |
| 5,243,268 | 9/1993 | Klatt | 318/771 |
| 5,367,234 | 11/1994 | DiTucci | 318/254 |

Primary Examiner—David S. Martin
Attorney, Agent, or Firm—Mark W. Pfeiffer; Michael A. Jaskolski; John J. Horn

[57] ABSTRACT

A method and apparatus to be used with a motor controller for determining if phase currents in a three phase AC motor are balanced. The phase angles between current zero crossing times for consecutive phase currents are compared to determine current balance and thyristor switches are employed to adjust phase angles and rebalance unbalanced currents.

13 Claims, 3 Drawing Sheets

METHOD AND APPARATUS FOR CURRENT REBALANCE IN INDUCTION MOTOR

BACKGROUND OF THE INVENTION

1. Field of the Invention

The present invention relates to systems for controlling current in three phase AC induction motors. More particularly, the present invention relates to a system which uses zero crossing current information provided by a motor control system to determine if the currents in the separate stator windings of a three phase AC motor are unbalanced and, if so, rebalances the currents accordingly.

2. Description of the Art

One type of commonly designed induction motor is a three phase motor having three Y-connected stator windings. In this type of motor, each stator winding is connected to an AC voltage source by a separate supply line, the source generating a current therein.

Modern power stations which supply voltage to AC motors usually supply well balanced three phase voltages having identical periods and amplitudes but having phases which differ by exactly 120 degrees. However, for various reasons, it is not uncommon for the voltages at the point of utilization, across the stator windings, to be unbalanced. Unbalanced stator voltages are generally recognized as undesirable for a plurality of reasons discussed below.

One major cause of unbalanced voltage is an electrical load which is not uniformly distributed on all three supply lines. Unbalanced loads frequently occur in rural electric power systems having supply lines of different lengths, but can also occur in larger urban power systems where there are heavy single-phase demands (e.g. heavy lighting loads on one of the three supply lines). Unbalanced voltage can also be caused by unsymmetrical transformer windings, unmatched transmission impedance or many other reasons.

Importantly, even a small voltage unbalance can result in a relatively large current unbalance in the stator windings of a three phase motor. For example, for a 3% voltage unbalance, the stator current unbalance might be 18% to 24%. This occurs because the voltage unbalance can be represented as a combination of a normal three phased positive sequence voltage component, plus a small negative sequence voltage component, which on its own would drive the motor in the reverse direction.

Unbalanced currents deliver uneven power to the rotor and thus produce undesirable torque pulsations and motor vibrations. The friction caused by the vibrating motor accelerates deterioration of the mechanical components of the motor. If the motor is operating at or near its fully rated load, the rotor and any stator windings carrying increased current heat up unnecessarily. While extreme overheating may trip an overload relay to switch off the motor and protect it from burning out, lesser degrees of unbalance usually go unchecked as the heat generated is insufficient to trip the overload relay.

Excess heat causes motor insulation to age at an accelerated rate and causes accelerated deterioration and evaporation of the bearing and other lubricant, both of which shorten the useful life of a motor. In addition, the excess motor heat is lost mechanical energy which means the motor is running inefficiently.

Control systems have been developed which can measure and correct current unbalance by regulating the period during which voltage is applied to the three stator windings. Many such control systems employ separate solid state switches connecting each stator winding to one of the three supply lines. Each solid state switch is formed by either a triac or a pair of back-to-back connected silicone controlled rectifiers (SCR's), commonly referred to as a thyristor.

The thyristor based control systems have a circuit which determines the proper time at which to trigger each thyristor switch during every half cycle of the associated supply line voltage. A triggered thyristor switch remains in a conductive state until the alternating current flowing through it goes to zero, after which time the thyristor must be triggered again to become conductive.

By altering the trigger times of the switches with respect to the zero crossings of the supply line current, the intervals during which the thyristors are conductive can be varied to control the amount of voltage applied to each stator winding and hence to control the current in each winding. Thus, rebalancing currents is relatively easy once unbalance is measured. However, measuring unbalance has generally been costly in both computational time and additional hardware.

Typically, current unbalance has been measured by placing transformers on each of the voltage supply lines. Each transformer isolates a current signal from the supply voltage and steps the current down from the high value found in motors (e.g. 10–1,000 A) to a value convenient to handle for signal processing (e.g. 100 mA). Deriving true RMS current values requires sampling the current in each line (at least 12 samples per cycle are needed, and usually 50 or more for RMS accuracy of a few percent). As rebalancing introduces harmonic frequency currents in each stator winding which mask fundamental frequency currents, filtering circuitry is usually needed to distill the fundamental frequency portion of each sample. Next, each fundamental frequency sample must be squared, the squares must be averaged to get a mean square value, and then the square root of the mean square must be calculated. Once the RMS current values for each cycle are known, the phase currents can be compared and rebalanced accordingly.

This solution to the current measurement problem requires special hardware in addition to that found in a typical motor controller. In addition, this solution requires a large amount of computational time which limits the ability of the motor controller to monitor other motor parameters. Therefore, it would be valuable to have a method by which current unbalance could be detected and corrected using information already supplied by the motor controller without direct measurement of current and without costly and time consuming current calculations.

SUMMARY OF THE INVENTION

The present invention is a method for determining if currents having a frequency of x cycles per second in a first, a second and a third stator winding of a three phase AC motor are balanced. The voltages are provided by a motor controller which indicates zero crossing times when each phase current is zero. The method comprises the steps of subtracting the zero crossing time of the first current from the zero crossing time of the second current to produce a first angle period; subtracting the zero crossing time of the second current from the zero crossing time of the third current to produce a second angle period; subtracting the zero crossing time of the third current from the following zero crossing time of the first current to produce a third angle period; comparing each angle period to an ideal period (⅙th cycle or 60°) to produce first, second and third angle error signals indicating first, second and third angle errors respectively; determining when any of the angle error signals is not within a predetermined acceptable maximum range; and producing a warning signal when any of the angle error signals is not within the predetermined acceptable maximum range.

Therefore, it is one object of the invention to provide a method by which a conventional motor controller can determine the existence of current unbalance without employing additional current sensing hardware. By comparing current zero crossing information already provided by the motor controller, the present method determines unbalance without requiring additional hardware. In addition, the present invention detects unbalance by comparing current zero crossing times, not current RMS values. Thus, RMS current values need not be calculated.

The method of the present invention also includes the method above wherein the controller includes a separate solid state switch or thyristor, connected in series to each stator winding. The controller controls each switch to produce a non-conducting period determining the associated current. The method further includes the steps of subtracting a fraction of the first angle error from the non-conducting period for the third solid state switch to produce a third modified period for the third solid state switch; subtracting a fraction of the second angle error from the non-conducting period for the first solid state switch to produce a first modified period for the first solid state switch; subtracting a fraction of the third angle error from the non-conducting period for the second solid state switch to produce a second modified period for the second solid state switch; and providing modified first, second and third periods to the control system for controlling associated switches. In a preferred method the fraction of the angle errors is ¼th and x is 60.

Thus, another object of the invention is to use the information about current unbalance derived from the current zero crossings to rebalance the currents. The method of the present invention adjusts the non-conducting period of each switch and uses a thyristor based controller to alter the voltage applied across the separate stator windings of the motor and thereby alters currents therein.

In a preferred method, the present invention also includes the steps of determining the temporal midpoint of each non-conducting period prior to calculating angle period and using each temporal midpoint as the zero crossing time for an associated current when determining the angle period. The temporal midpoint is the approximate zero crossing point of the fundamental current. In this manner, the fundamental frequency of each current is compared and rebalanced as the fundamental current dominates the operation of the motor.

The present invention also includes an apparatus to be used with the above described method.

The apparatus includes a period calculator which receives the current zero crossing information from the control system corresponding to the first, second and third currents, subtracts the zero crossing time of the first current from the zero crossing time of the second current to produce a first angle period, subtracts the zero crossing time of the second current from the zero crossing time of the third current to produce a second angle period, and subtracts the zero crossing time of the third current from the following zero crossing time of the first current to produce a third angle period. The apparatus also includes a subtractor which receives the first, second and third angle periods from the period calculator and subtracts each angle period from 1/6x second to produce a first, second and third angle error signal. A comparator compares each angle error signal to a predetermined maximum error signal and produces a warning signal when any of the angle error signals is greater than the maximum error signal. Means are provided which indicate when the comparator has produced a warning signal.

Thus, the apparatus of the present invention may use information provided by a standard motor control system, without additional hardware, to determine if stator winding current is balanced and may produce a warning signal when currents are sufficiently unbalanced.

The present invention also includes the above described apparatus wherein the controller is connected in series to each stator winding. The controller controlling each switch provides a non-conducting period determining an associated current.

The apparatus further comprises a period modifier which receives the angle error signals from the comparator and information regarding the non-conducting periods for the three switches from the control system. The period modifier subtracts a fraction of the first angle error from the non-conducting period for the third switch to produce a third modified period signal, subtracts a fraction of the second angle error from the non-conducting period for the first switch to produce a first modified period signal, and subtracts a fraction of the third angle error from the non-conducting period for the second switch to produce a second modified period signal. Means are employed to provide the modified first, second and third period signals to the control system for controlling associated switches.

Another object of the invention is to produce an apparatus which can simply and effectively rebalance unbalanced stator currents. The present invention does this by controlling the width of switch non-conducting periods in a manner known in the art.

This patent describes a novel method and apparatus for both detecting unbalance and rebalancing the currents in the stator windings of a motor. The present invention detects and rebalances currents without the need for additional hardware or large amounts of computational time.

Other and further aspects of the present invention will become apparent during the course of the following description and by reference to the accompanying drawings.

DETAILED DESCRIPTION OF THE PREFERRED EMBODIMENT

Figure 1:
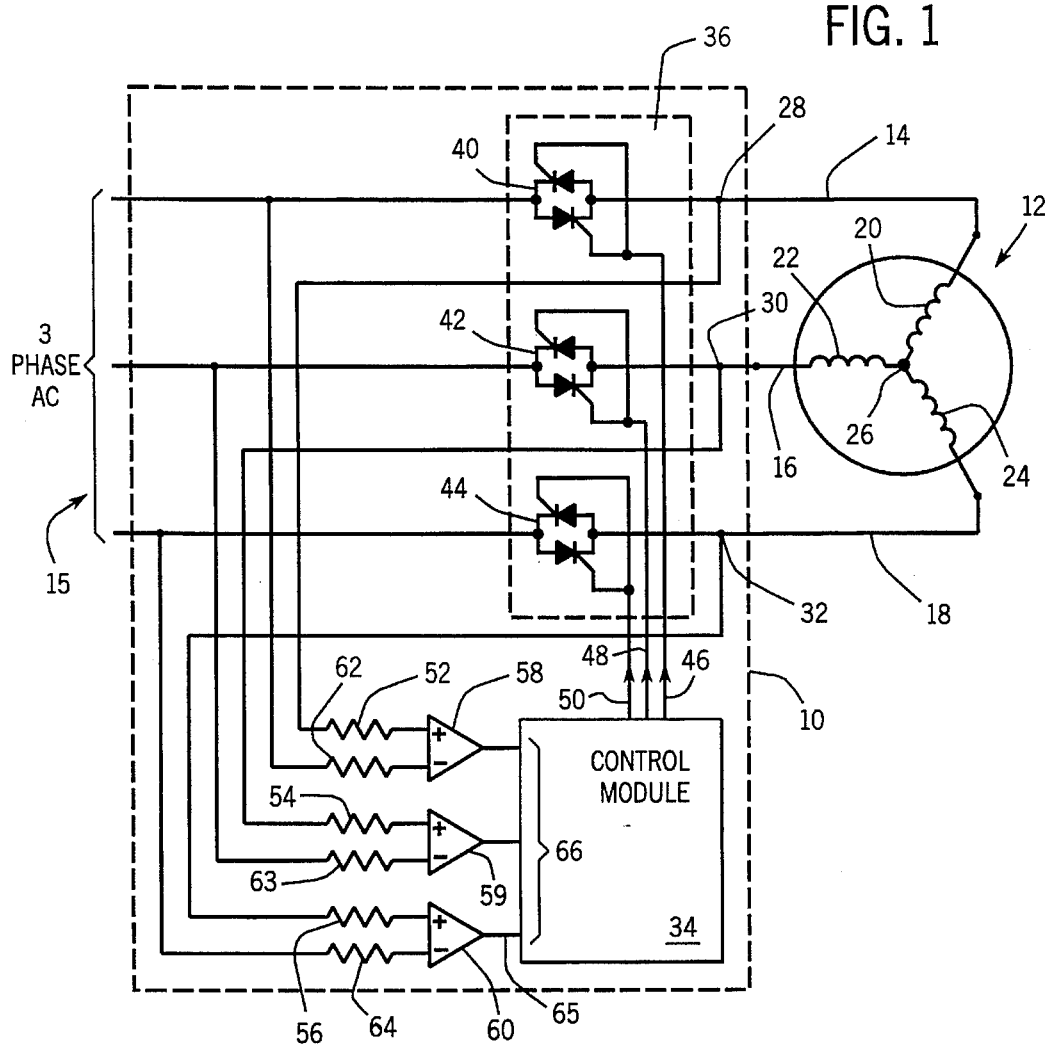
FIG. 1 is a schematic diagram of a motor and a controller which incorporates the present invention.

The present invention will be described in the context of the exemplary motor control system 10 shown in FIG. 1. The control system 10 receives three phase alternating current 15, detects current unbalance in a manner to be described below, rebalances the current and delivers the balanced currents to an AC induction electric motor 12 along supply lines 14, 16, 18.

The induction motor 12 has three stator windings 20, 22, 24 which are coupled in a Y configuration at neutral node 26. The distal end of each stator winding 20, 22, 24 is connected to the supply line 14, 16, 18 at a motor terminal 28, 30, 32 respectively. The phase of the voltage on supply line 14 leads the phase of the voltage on supply line 16 which in turn leads the phase voltage on supply line 18.

The motor control system 10 consists of a control module 34, a thyristor switch module 36, and a plurality of other components which will be described in more detail below. The other components include three differential amplifiers 58, 59, 60 coupled to the supply lines 14, 16, 18 to detect current zero crossing times. The control module 34 uses the information supplied by the differential amplifiers 58, 59, 60 to control the thyristor switch module 36 and control currents in the supply lines 14, 16, 18 in a manner described below.

The thyristor switch module 36 has three separate thyristor switches 40, 42, 44. Each thyristor switch 40, 42, 44 consists of a pair of inversely connected silicon controlled rectifiers (SCR's). Each thyristor switch 40, 42, 44 controls the voltage on, and current through, an associated supply line 14, 16 or 18.

Figure 2A:
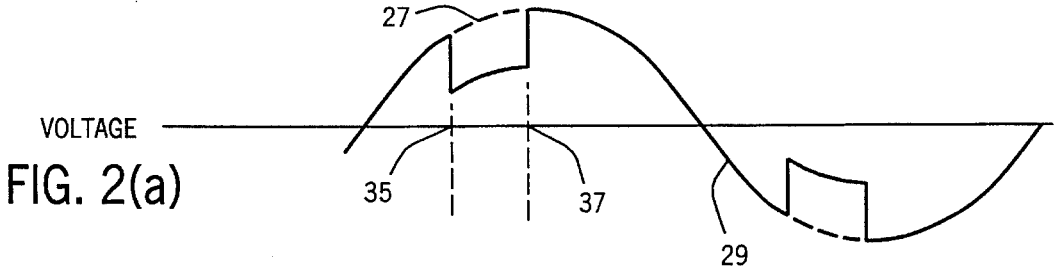
FIGS. 2A and 2B are graphs illustrating the voltage across and current through a pair of SCR's in FIG. 1 as a function of time.
Figure 2B:
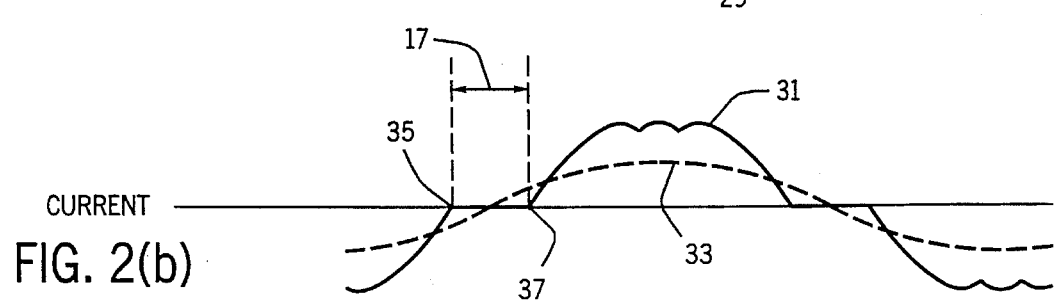

Referring to FIGS. 2A and 2B, the current and voltage on a single supply line 14, 16 or 18 may be compared to the current and voltage of the AC source 15. In FIG. 2A, the supply voltage 27 is sinusoidal. The terminal voltage 29 is generally identical to the supply voltage 27, except for during a small non-conducting time, or notch 17 having a duration of γ, which is introduced into each half cycle of supply voltage 27. The notch 17 is introduced into the supply voltage 27 each time an associated line current 31 (See FIG. 2B) crosses zero. Current 31 remains zero until the end of the notch γ, at which time the current 31 continues a pulsating waveform having a fundamental sinusoidal component 33 which generally lags the terminal voltage 29 by an angle related to the power factor of the motor.

The control system 10 used with the present invention alters supply line current by controlling the period of notch 17. During the duration γ, the thyristor pair comprising one thyristor switch 40, 42 or 44 and connecting one stator winding 20, 22 or 24 to the voltage source operates as an open circuit, so that, instead of observing the sinusoidal supply voltage at the terminal 28, 30 or 32, an internally generated motor back EMF voltage may be seen. This gives a notch γ in the observed waveform at the terminal 28, 30 or 32.

The control module 34 determines the proper times at which to trigger each thyristor switch 40, 42 or 44, a triggered switch effectively operating as a short circuit until current flowing through it goes to zero. When current goes to zero, the thyristor switch 40, 42 or 44 operates as an open circuit and will remain non-conductive until retriggered.

By altering the trigger times 37 of the thyristor switches 40, 42 or 44 with respect to the zero crossings 35 of supply line current, the intervals during which the thyristor switches 40, 42 or 44 are non-conductive can be varied to control voltages applied to and hence the currents in the stator windings 20, 22, 24. This type of control is known as phase control. The control module 34 triggers each thyristor switch 40, 42, 44 by sending a "Firing" signal to a gate lead on each switch through lines 46, 48, 50.

Typical controls have used thyristor switches like those employed in the present invention, to maintain equal voltages in each stator winding 20, 22, 24 for soft starting & stopping the motors. In addition, the switches have been used to control torque and slippage in motor operation.

Referring again to FIG. 1, the control module 34 determines the proper time at which to trigger each thyristor switch 40, 42 or 44 during every half cycle of the associated supply line voltage. In order to determine the proper times at which to emit trigger pulses to rebalance stator winding currents, the control module 34 receives a number of input signals indicating electrical parameters of the motor 12.

For the purpose of the present invention, each of the three supply lines 14, 16, 18 is coupled by a voltage dropping resistor 52, 54, 56 to the positive input of a differential amplifier 58, 59, 60, respectively. The negative inputs of the differential amplifiers 58, 59, 60 are coupled by voltage dropping resistors 62, 63, 64 to respective phases of the AC supply 15. Each differential amplifier output indicates the nonconductive state of an associated thyristor switch 40, 42, 44. The signals from the differential amplifiers are collectively referred to herein as "thyristor voltages" 65 and are applied to a set of three control module inputs 66.

As the voltage across a thyristor switch 40, 42, 44 is essentially zero when the switch is conducting current and rises only when current crosses zero and the switch becomes non-conductive, by monitoring the thyristor voltages with the differential amplifiers 58, 59, 60, the current zero crossing times are determined by the control module. A sharp rise in thyristor switch voltage corresponds in time to a current zero crossing moment.

Importantly, most controllers are already equipped with some sort of mechanism which determines current zero crossing times. Thus, the present invention could be used with any controller providing such information and the differential amplifier portions of FIG. 1 might be eliminated.

Figure 3:
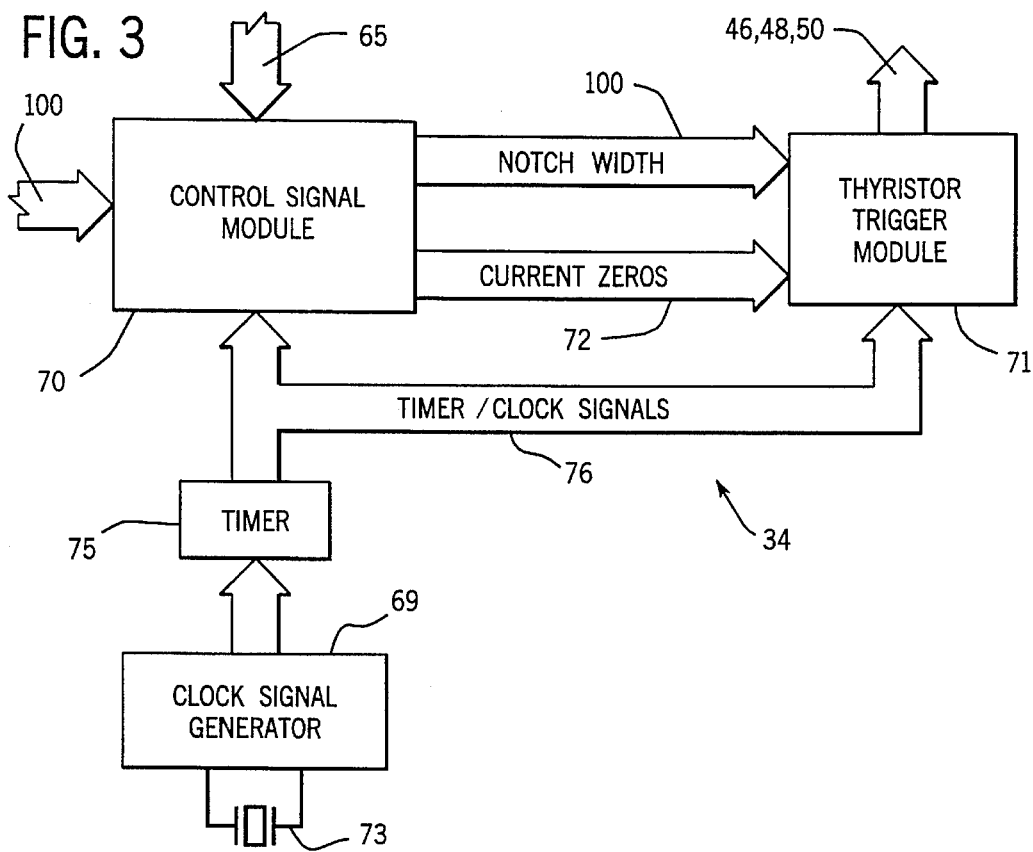
FIG. 3 is a block diagram of the control system shown in FIG. 1.

Referring now to FIG. 3, the control module 34 consists of three functional modules, a control signal module 70 which receives notch information 100 and current zero crossing 65 information to determine proper notch 17 adjustments, a thyristor trigger module 71 to fire each thyristor switch and a clock signal generator 69. The modules 69, 70, and 71 are interconnected by a series of control signal lines 72, 100 and clock signal lines 76. The clock signal generator 69 divides a reference signal generated by an external crystal 73 to derive frequency clock signals which are used by the timer 75 in providing timer signals for the other two modules 70, and 71.

Figure 4A:
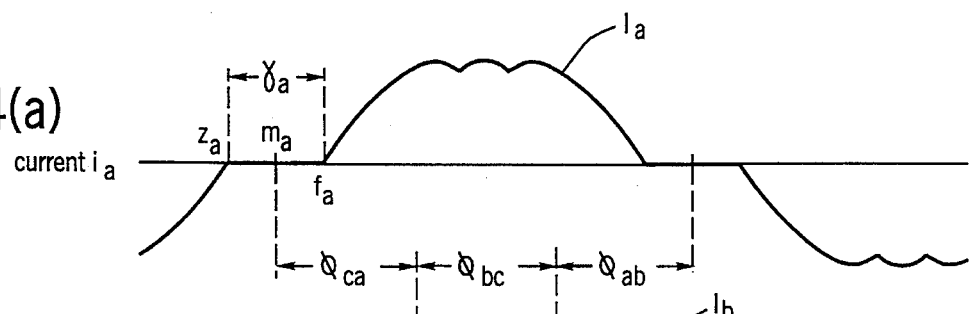
FIGS. 4A, 4B and 4C are graphs illustrating the currents through the three supply lines in FIG. 1 as a function of time.
Figure 4B:
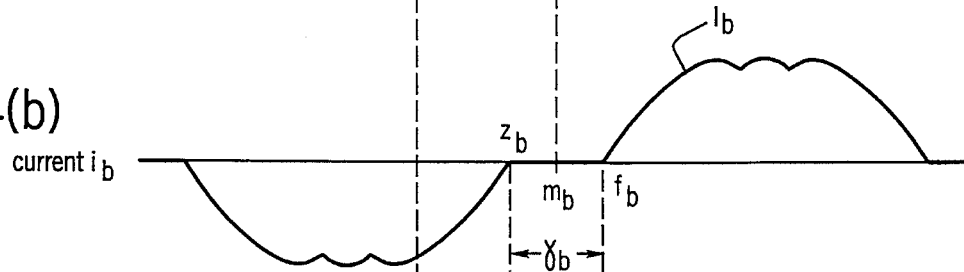
Figure 4C:
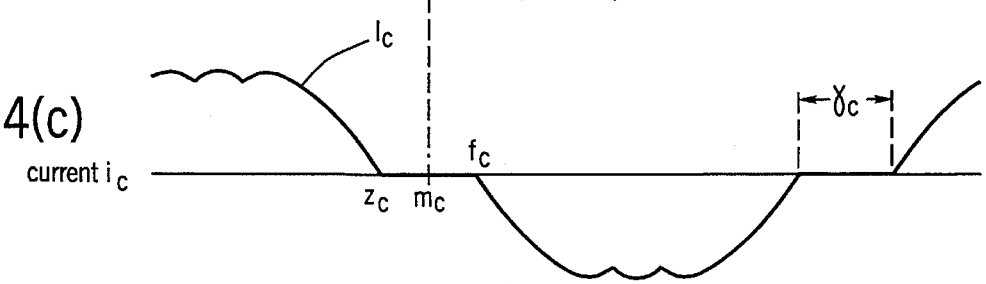

In order to understand how the control signal module 70 works, it is necessary to understand the relationships between voltages, currents and phase angles in a three phase system. Referring to FIGS. 4A, 4B and 4C, the three curves represent line currents $I_a$, $I_b$ and $I_c$ corresponding to voltages $V_a$, $V_b$ and $V_c$ on the supply lines 14, 16, and 18 respectively. For an induction motor with symmetrical windings and a balanced three phase supply voltage, $$\vec{V}_a + \vec{V}_b + \vec{V}_c = 0; \tag{1}$$

$$|\vec{V}_a|=|\vec{V}_b|=|\vec{V}_c|; \tag{2}$$

$$|\vec{I}_a|=|\vec{I}_b|=|\vec{I}_c|; \tag{3}$$

$$\vec{I}_a+\vec{I}_b+\vec{I}_c=0; \tag{4}$$ and, $$\phi_{ab}=\phi_{bc}=\phi_{ca}=60° \tag{5}$$

where $\phi_{ab}$, $\phi_{bc}$, $\phi_{ca}$ are the phase angles between the zero crossing points for the fundamental components of the three phase currents $I_a$, $I_b$ and $I_c$.

Figure 6:
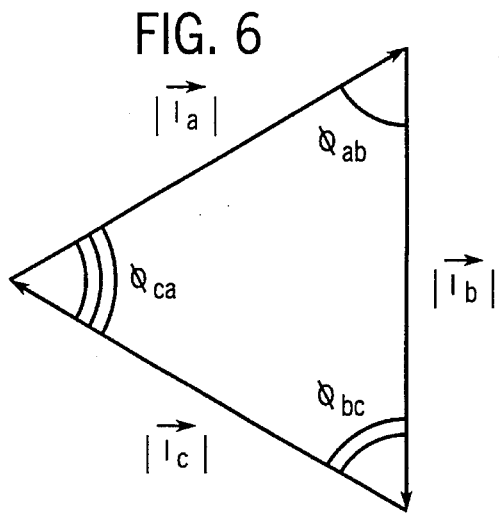
FIG. 6 is a vector diagram showing the geometric relationship between currents and phase angles in a three phase motor.

Referring also to FIG. 6, because of the relationships between currents $I_a$, $I_b$ and $I_c$ and their associated phase angles $\phi_{ab}$, $\phi_{bc}$ and $\phi_{ca}$ expressed in Equations 3, 4 and 5, these currents and angles can be represented by a triangle where the sides correspond to current magnitudes $|\vec{I}_a|$, $|\vec{I}_b|$ and $|\vec{I}_c|$ and the angles correspond to phase angles $\phi_{ab}$, $\phi_{bc}$ and $\phi_{ca}$. Using well known geometric theorems, the relationships between the current magnitudes and phase angles in FIG. 6 can be represented as:

$$\frac{|\vec{I}_a|}{\sin(\phi_{bc})}=\frac{|\vec{I}_b|}{\sin(\phi_{ca})}=\frac{|\vec{I}_c|}{\sin(\phi_{ab})}=K \tag{6}$$

where K is a constant. Solving Equation 6 for $|\vec{I}_a|$, $|\vec{I}_b|$ and $|\vec{I}_c|$:

$$|\vec{I}_a|=K*\sin(\phi_{bc}) \tag{7}$$

$$|\vec{I}_b|=K*\sin(\phi_{ca}) \tag{8}$$

$$|\vec{I}_c|=K*\sin(\phi_{ab}). \tag{9}$$

It can be seen from Equations 7, 8 and 9 that the amplitudes of the currents $I_a$, $I_b$ and $I_c$ are proportional to the phase angles $\phi_{bc}$, $\phi_{ca}$ and $\phi_{ab}$ respectively. Therefore, when all the phase angles $\phi_{bc}$, $\phi_{ca}$ and $\phi_{ab}$ are equal to 60°, $|\vec{I}_a|$, $|\vec{I}_b|$ and $|\vec{I}_c|$ are equal and the system is balanced. When any phase angle $\phi_{bc}$, $\phi_{ca}$ and $\phi_{ab}$ is not equal to 60°, the system is unbalanced and must be adjusted.

For example, referring to FIG. 6, if the phase angle is bigger than 60° it can be seen that $|\vec{I}_a|$ is definitely bigger than $|\vec{I}_b|$ or $|\vec{I}_c|$ or both. This situation reflects that $|\vec{V}_a|$ is higher than $|\vec{V}_b|$ or $|\vec{V}_c|$ or both. The notch $\gamma$ associated with $|\vec{V}_a|$ should be increased to reduce $|\vec{V}_a|$. However, if the phase angle $\phi_{bc}$ is less than 60° the notch $\gamma$ associated with $|\vec{V}_a|$ must be decreased to grow $|\vec{V}_a|$.

Thus, unbalance can be determined by comparing current zero crossing times and rebalance can be achieved by adjusting the three thyristor notches $\gamma$. Since the data on notch width and current zero crossings can be obtained from a conventional motor controller, the phase angles $\phi_{ab}$, $\phi_{bc}$ and $\phi_{ca}$ can be calculated without a direct measurement of currents.

Referring still to FIGS. 4A, 4B and 4C, points $z_a$, $z_b$, and $z_c$ are the instances when currents reach zero. Points $f_a$, $f_b$, and $f_c$ are the firing times of the thyristor switches 40, 42, 44. The notches $\gamma_a$, $\gamma_b$ and $\gamma_c$ are the intervals between associated z and f points. Since the fundamental component of line current mainly determines the operating performance of an induction motor, the phase angles $\phi_{ab}$, $\phi_{bc}$ and $\phi_{ca}$ between the three phase fundamental current components are of particular interest. In FIGS. 4A, 4B and 4C, $m_a$, $m_b$ and $m_c$ represent the zero crossing points for the fundamental portion of each line current $I_a$, $I_b$ and $I_c$ and are the midpoints between associated z and f points.

Figure 5:
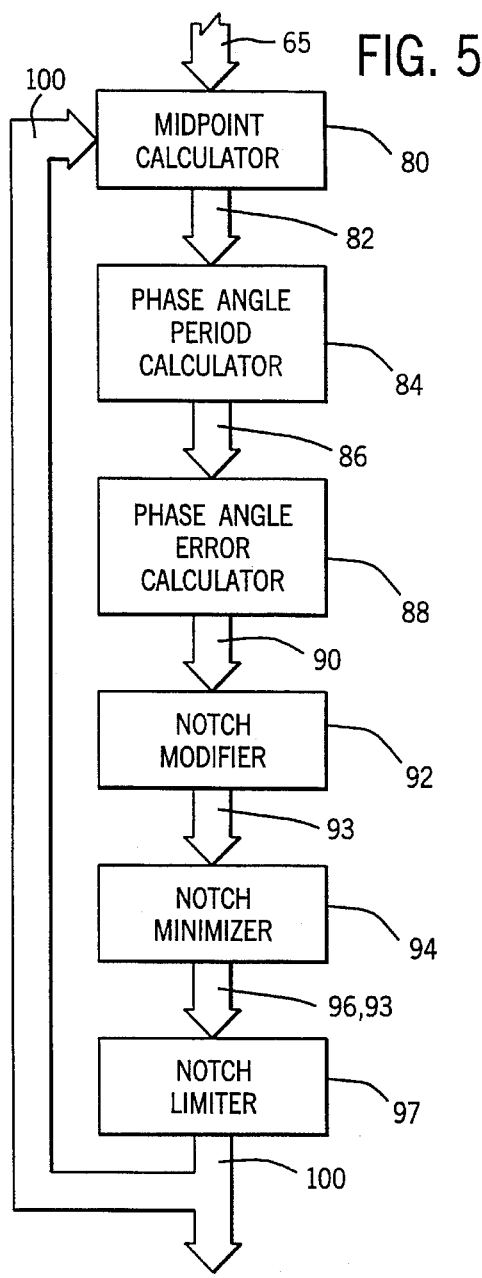
FIG. 5 is a flow chart depicting the operation of the control signal module which takes notch and zero crossing information and modifies the non-conducting periods of the thyristors.

Referring also to FIG. 5, the control signal module 70 in the present invention will typically be a microprocessor which carries out the method of the present invention according to a series of steps. While the present invention will be described as a method, it should be understood that the invention could easily be implemented using solid state circuit components as well known in the art. Module 70 carries out different portions of a computer code. The code incorporates a midpoint calculator 80 which receives thyristor voltage indicating current zero crossing times from each differential amplifier 58, 59, 60 and the signals indicating the width of initial notch periods $\gamma_a$, $\gamma_b$ and $\gamma_c$. The midpoint calculator 80 determines the notch midpoints $m_a$, $m_b$ and $m_c$ and produces midpoint signals 82, according to the following equations:

$$m_a = z_a + \frac{\gamma_a}{2}; \tag{10}$$

$$m_b = z_b + \frac{\gamma_b}{2}; \tag{11}$$

and $$m_c = z_c + \frac{\gamma_c}{2}. \tag{12}$$

The midpoint signals 82 are provided to a phase angle period calculator 84 which determines periods, or phase angles $\phi_{ab}$, $\phi_{bc}$ and $\phi_{ca}$ between consecutive current zero crossings and produces phase angle signals 86 according to the following equations:

$$\phi_{ab}=m_b-m_a; \tag{13}$$

$$\phi_{bc}=m_c-m_b; \tag{14}$$

$$\phi_{ca}=m_a-m_c. \tag{15}$$

Next, the phase angle period signals 86 are provided to a phase angle error calculator 88 which subtracts each period signal 86 from the ideal period $\tau$ (60° or 1/6th cycle) to produce error signals 90 indicative of phase angle errors $\zeta_{ab}$, $\zeta_{bc}$ and $\zeta_{ca}$:

$$\zeta_{bc}=\tau-\phi_{bc}; \tag{16}$$

$$\zeta_{ca}=\tau-\phi_{ca}; \tag{17}$$

$$\zeta_{ab}=\tau-\phi_{ab}. \tag{18}$$

Once phase angle errors $\zeta_{ab}$, $\zeta_{bc}$ and $\zeta_{ca}$ are calculated, the control signal module 70 may either signal that one or more of the errors is greater than a maximum acceptable error or may proceed to calculate new notch periods which will correct for current unbalance.

When correcting current unbalance, it is important to note the interdependence between currents and phase angles expressed in Equations 7, 8 and 9 and apparent from a perusal of FIG. 6. Referring also to FIG. 6 and Equation 7, $|\vec{I}_a|$ changes when $\phi_{bc}$, the phase angle between $I_b$ and $I_c$ is adjusted. Therefore, to correct unbalance, $\gamma_a$ must be adjusted by $\zeta_{bc}$, the phase angle error between $I_b$ and $I_c$. In a like fashion, $\zeta_{ab}$ is used to adjust $\gamma_c$ and $\zeta_{ca}$ is used to adjust $\gamma_b$. Referring still to FIG. 5, a notch modifier 92 adjusts notches by subtracting appropriate phase angle errors $\zeta_{ba}$, $\zeta_{ca}$ and $\zeta_{ab}$ from associated notches $\gamma_a$, $\gamma_b$ and $\gamma_c$. To avoid sudden large changes in notch width which could result in a jolt to the rotor, the notch modifier 92 may first divide the phase angle errors by some factor. In a preferred embodiment, this factor is 4. The notch modifier 92 produces modified notch signals 93 according to the following three equations:

$$Mod\ \gamma_a = \gamma_a - \frac{\zeta_{bc}}{4} ;\qquad(19)$$

$$Mod\ \gamma_b = \gamma_b - \frac{\zeta_{ca}}{4} ;\qquad(20)$$

and $$Mod\ \gamma_c = \gamma_c - \frac{\zeta_{ab}}{4} .\qquad(21)$$

Referring again to FIG. 6, it should be appreciated that when any notch $\gamma_a$, $\gamma_b$ or $\gamma_c$ is adjusted, all of the phase angles $\phi_{ab}$, $\phi_{bc}$ and $\phi_{ca}$ change slightly and hence all currents $I_a$, $I_b$ and $I_c$ change. This constant interdependence introduces the possibility that $\gamma_a$, $\gamma_b$ and/or $\gamma_c$ might grow too large and result in currents too small to power the motor 12. Under these conditions, the motor 12 may stall. Therefore, it is necessary to keep the notches $\gamma_a$, $\gamma_b$ or $\gamma_c$ as small as possible while still achieving a balance condition. To achieve this, the modified notch signals 93 are provided to a notch minimizer 94 which determines which modified notch 93 is the smallest and subtracts the equivalent of a 2° notch therefrom to produce a minimized notch 96.

In addition, the modified notch signals 93 and the minimized notch 96 are provided to a notch limiter 97 which restricts notch size to between 5° and 55°. The notch limiter 97 produces new notch period signals 100 which are used by the thyristor trigger module 71 to adjust notch width. In addition, these new notch signals are used by the midpoint calculator 80 along with a new set of supply line current signals 65 to determine the next set of notch adjustments.

Figure 7:
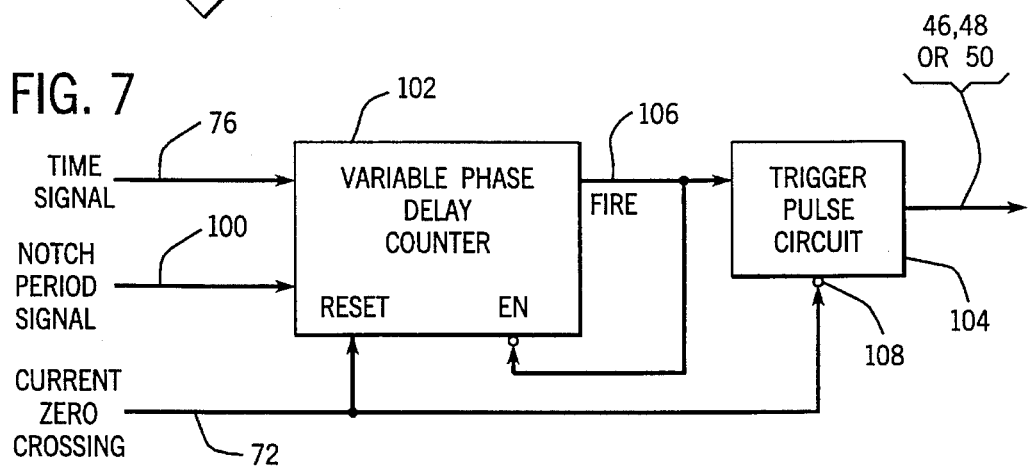
FIG. 7 is a block diagram of the thyristor trigger module of FIG. 3.

Referring again to FIG. 3, the control module 34 includes a thyristor trigger module 71 having three identical subcircuits, one for each of the three supply lines 14, 16, 18 and their corresponding thyristor switches 40, 42, 44. FIG. 7 illustrates one of these subcircuits which has a variable phase delay counter 102 and a trigger pulse generating circuit 104. The clock input for the variable phase delay counter 102 receives a signal designated TIME SIGNAL from the clock signal generator 69 via the clock signal lines 76. The reset input of the phase delay counter 102 receives a brief pulse by way of line 72 from the control signal module 70 whenever the corresponding supply line current crosses through zero. Therefore, the count within the phase delay counter 102 is reset upon the occurrence of each zero current crossing and thereafter the counter 102 counts the clock signal pulses from the clock signal generator 69 until reset. It should be understood that the functionality of the control module 34 can also be implemented in software.

When the phase delay counter 102 reaches a count corresponding to the notch period signal provided on line 100, an output signal on line 106 goes high providing a signal, designated "FIRE", indicating that the appropriate thyristor switch 40, 42, 44 should be triggered (or fired). The FIRE signal 106 is fed back to the active low enable terminal of the phase delay counter 102 to disable the counter to maintain a constant high level output signal until reset at the next zero current crossing.

The FIRE signal 106 is also applied to a conventional trigger pulse circuit 104 which produces an active thyristor trigger pulse on an output line 46, 48 or 50 as along as the FIRE signal is high and the signal at its enable input 108 is low. This enable input 108 is coupled to line 72 which indicates when the line current crosses through zero. As long as current is not flowing through an associated thyristor switch 40, 42 or 44, an active trigger pulse is generated on output lines 46, 48 or 50.

However, once a current begins to flow through the thyristor switch, the signal on line 72 goes high and disables the trigger pulse circuit 104 terminating the thyristor trigger pulse. Thus, the thyristor trigger pulse has a duration which is just long enough to render the thyristor conductive, where it normally remains until the alternating supply line current goes to zero. This process of counting off notch period and firing of the thyristor switches 40, 42, 44 takes place many times a second and continues until the motor is turned off, the duration of each period being changed continuously by the control signal module 70.

Thus, it can be seen that the controller 10 of the present invention detects supply line current unbalance without the use of current sensors and rebalances supply line current. It is to be understood that the above described embodiments are simply illustrative of the principals of this invention. Various other modifications and changes may be made by those skilled in the art which will embody the principals of the invention and fall within the spirit and scope thereof. For example, while the present invention is described above as a method, the invention also incorporates an apparatus which could be used instead of a controller microprocessor. The apparatus may include solid state circuitry, as known in the art, to carry out the above described method. In addition, rather than operating on a motor having three stator windings 20, 22, 24 in a Y configuration, a Δ configuration, as well known in the art, could be employed.

We claim:

1. A method for operating a motor controller to detect imbalance between phase currents in a three phase motor and to rebalance said phase currents when imbalance is detected, the motor controller utilizing switching devices to periodically connect stator windings of the three phase motor to respective supply lines of a three phase current source in which each switching device enters a non-conductive state during a portion of each alternating current half cycle to define notch periods $\gamma_a$, $\gamma_b$, and $\gamma_c$ in each respective phase a, b, and c of the three phase current source, with each of the notch periods $\gamma_a$, $\gamma_b$, and $\gamma_c$ beginning from a time when current through the respective switching device becomes zero, and ending at a time when the respective switching device is again placed in a conductive state, the method comprising the steps of:

producing a first angle period $\phi_{ca}$ by measuring the time between occurrence of the notch period $\gamma_a$ for phase a and the next subsequent occurrence of notch period $\gamma_c$ for phase c;

producing a second angle period $\phi_{bc}$ by measuring the time between occurrence of the notch period $\gamma_c$ for phase c and the next subsequent occurrence of notch period $\gamma_b$ for phase b;

producing a third angle period $\phi_{ab}$ by measuring the time between occurrence of the notch period $\gamma_b$ for phase b and the next subsequent occurrence of notch period $\gamma_a$ for phase a;

comparing each of the first, second, and third angle periods $\phi_{ca}$, $\phi_{bc}$, and $\phi_{ab}$ to an ideal angle period to produce first, second and third angle error signals $\xi_{ca}$, $\xi_{bc}$, and $\xi_{ab}$ indicating first, second and third phase angle errors respectively;

determining when any of the first, second, or third angle error signals $\xi_{ca}$, $\xi_{bc}$, and $\xi_{ab}$ is not within a predetermined acceptable maximum range; and when any of the first, second, or third angle error signals $\xi_{ca}$, $\xi_{bc}$, and $\xi_{ab}$ is determined to not be within the predetermined acceptable maximum range, then separately modifying the relative times for placing the switching devices into the conductive state for each respective phase in a manner which reduces the first, second, or third angle error signals $\xi_{ca}$, $\xi_{bc}$, and $\xi_{ab}$ to be within the predetermined acceptable maximum range.

2. The method as recited in claim 1 in which the step of separately modifying the relative times for placing the switching devices for each phase a, b, and c of the three phase current source into the conductive state comprises scheduling the next subsequent time for placing each switching device in the conductive state at respective modified periods MOD $\gamma_a$, MOD $\gamma_b$, and MOD $\gamma_c$ following the next subsequent zero current condition for the respective switching device according to the equations:

$$MOD\, \gamma_a = \gamma_a - \frac{\zeta_{bc}}{K}\,;$$

$$MOD\, \gamma_b = \gamma_b - \frac{\zeta_{ca}}{K}\,;$$

and $$MOD\, \gamma_c = \gamma_c - \frac{\zeta_{ab}}{K}\,;$$

where K is a positive constant.

3. The method as recited in claim 2 in which the first, second, and third angle periods $\phi_{ca}$, $\phi_{bc}$, and $\phi_{ab}$ are produced based upon the temporal midpoint of each notch period $\gamma_a$, $\gamma_b$, and $\gamma_c$, respectively.

4. The method as recited in claim 3 further including the steps of:

determining which of the first, second and third modified periods MOD $\gamma_a$, MOD $\gamma_b$, and MOD $\gamma_c$ is numerically the smallest;

subtracting a safety period from said numerically smallest modified period to produce a minimized period; and using the minimized period in place of said numerically smallest modified period when scheduling the next subsequent time for placing the switching device associated with said numerically smallest modified period in the conductive state.

5. The method as recited in claim 4 further including the step of restricting the modified periods MOD $\gamma_a$, MOD $Y_b$, and MOD $\gamma_c$ to between a minimum period and a maximum period.

6. The method as recited in claim 2 wherein the value of K is 4.

7. The method as recited in claim 5 wherein the safety period is the equivalent of a 2° notch, the minimum period is the equivalent of a 5° notch, and the maximum period is the equivalent of a 55° notch.

8. A motor controller for detecting imbalance between phase currents in a three phase motor and to rebalancing said phase currents when imbalance is detected, the motor controller utilizing switching devices to periodically connect stator windings of the three phase motor to respective supply lines of a three phase current source in which each switching device enters a non-conductive state during a portion of each alternating current half cycle to define notch periods $\gamma_a$, $\gamma_b$, and $\gamma_c$ in each respective phase a, b, and c of the three phase current source, with each of the notch periods $\gamma_a$, $\gamma_b$, and $\gamma_c$ beginning from a time when current through the respective switching device becomes zero, and ending at a time when the respective switching device is again placed in a conductive state, the motor controller comprising:

a period calculator which produces first, second, and third angle periods $\phi_{ca}$, $\phi_{bc}$, and $\phi_{ab}$, respectively, the first angle period $\phi_{ca}$ being produced by measuring the time between occurrence of the notch period $\gamma_a$ for phase a and the next subsequent occurrence of notch period $\gamma_c$ for phase c, the second angle period $\phi_{bc}$ being produced by measuring the time between occurrence of the notch period $\gamma_c$ for phase c and the next subsequent occurrence of notch period $\gamma_b$ for phase b, and the third angle period $\phi_{ab}$ being produced by measuring the time between occurrence of the notch period $\gamma_b$ for phase b and the next subsequent occurrence of notch period $\gamma_a$ for phase a;

a subtractor which receives the first, second and third angle periods $\phi_{ca}$, $\phi_{bc}$, and $\phi_{ab}$ from the period calculator and subtracts each of said first, second and third angle periods $\phi_{ca}$, $\phi_{bc}$, and $\phi_{ab}$ from an ideal period to produce first, second and third angle error signals $\xi_{ca}$, $\xi_{bc}$, and $\xi_{ab}$, indicating first, second and third phase angle errors respectively; and a comparator for comparing each angle error signal $\xi_{ca}$, $\xi_{bc}$, and $\xi_{ab}$ received from the subtractor to a predetermined maximum error signal and when any of the first, second, or third angle error signals $\xi_{ca}$, $\xi_{bc}$, and $\xi_{ab}$ exceeds the predetermined maximum error signal, then separately modifying the relative times for placing the switching devices into the conductive state for each respective phase in a manner which reduces the first, second, or third angle error signals $\xi_{ca}$, $\xi_{bc}$, and $\xi_{ab}$ to be within the predetermined acceptable maximum range.

9. The motor controller as recited in claim 8 further comprising:

a period modifier which receives the angle error signals $\xi_{ca}$, $\xi_{bc}$, and $\xi_{ab}$ from the comparator and forms modified periods according to the equations:

$$MOD\, \gamma_a = \gamma_a - \frac{\zeta_{bc}}{K}\,;$$

$$MOD\, \gamma_b = \gamma_b - \frac{\zeta_{ca}}{K}\,;$$

and $$MOD\, \gamma_c = \gamma_c - \frac{\zeta_{ab}}{K}\,;$$

where K is a positive constant; and means for utilizing the modified periods MOD $\gamma_a$, MOD $\gamma_b$, and MOD $\gamma_c$ to control times for placing the respective switching devices in the conductive state following the respective next subsequent zero current condition.

10. The motor controller as recited in claim 9 further including a midpoint finder which determines the first, second, and third angle periods $\phi_{ca}$, $\phi_{bc}$, and $\phi_{ab}$ based on the temporal midpoint of each notch period $\gamma_a$, $\gamma_b$, and $\gamma_c$ 11. The motor controller as recited in claim 10 further including a period minimizer which determines which of the first, second and third modified periods MOD $\gamma_a$, MOD $\gamma_b$, and MOD $\gamma_c$ is numerically the smallest and subtracts a safety period from said numerically smallest modified period to produce a minimized period which is utilized in place of said numerically smallest modified period when scheduling the next subsequent time for placing the switching device associated with said numerically smallest modified period in the conductive state.

12. The motor controller as recited in claim 11 further including a limiter which restricts each of the modified periods MOD $\gamma_a$, MOD $\gamma_b$, and MOD $\gamma_c$ to between a minimum period and a maximum period.

13. The motor controller as recited in claim 9 wherein K is 4.

* * * * *